(No Model.) 2 Sheets—Sheet 1.
C. W. NASON.
MACHINE FOR WELDING PLUGS IN THE ENDS OF TUBES.
No. 331,527. Patented Dec. 1, 1885.
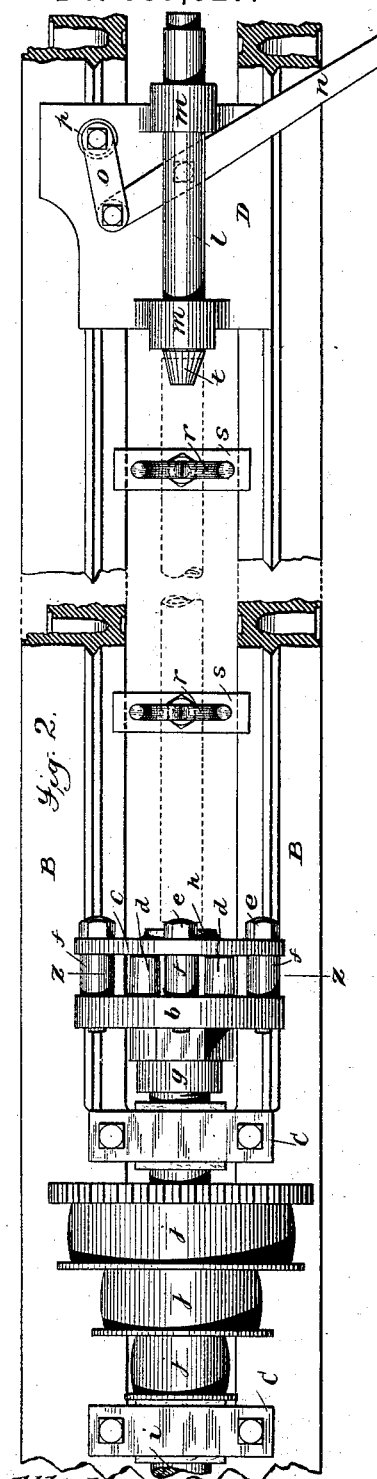
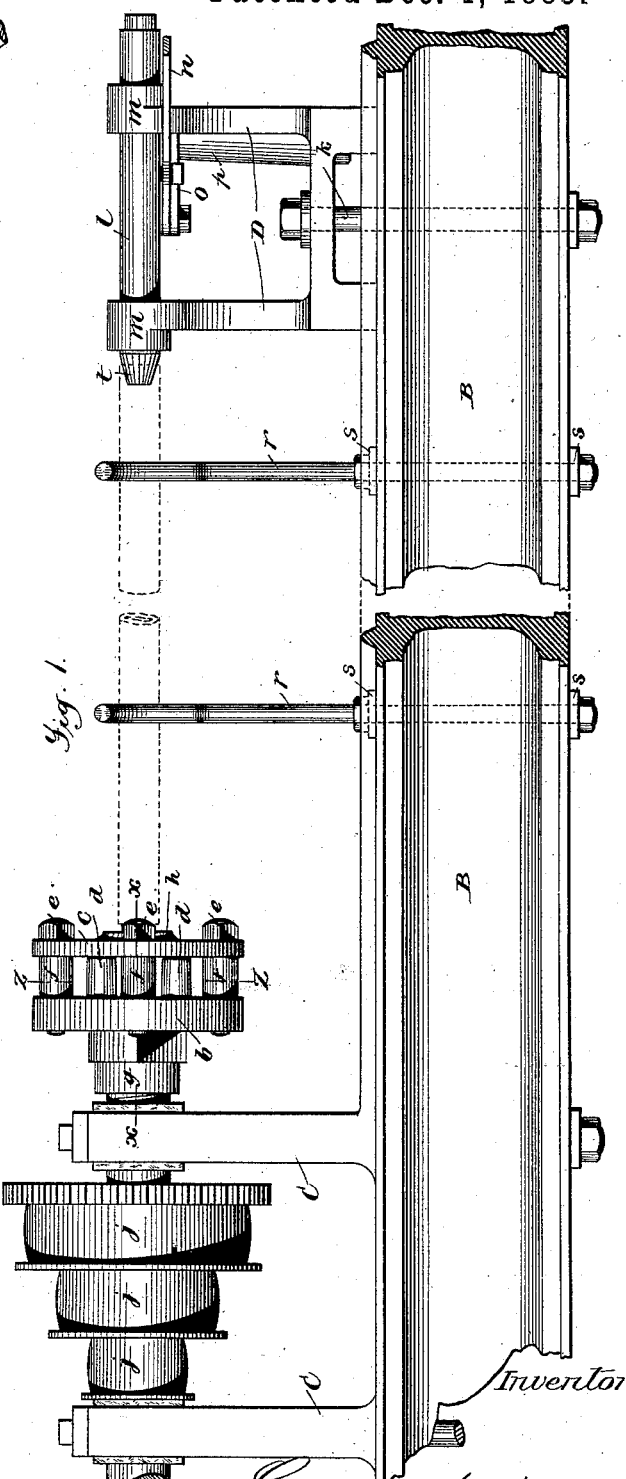

(No Model.) 2 Sheets—Sheet 2.
C. W. NASON.
MACHINE FOR WELDING PLUGS IN THE ENDS OF TUBES.
No. 331,527. Patented Dec. 1, 1885.
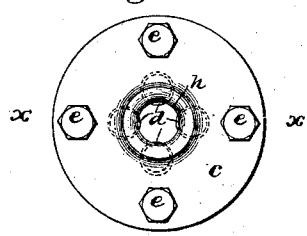
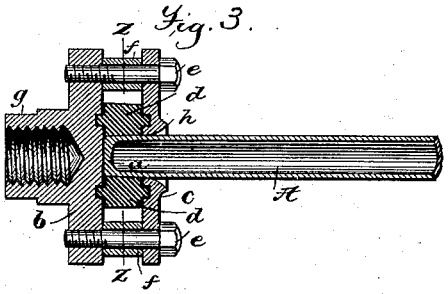
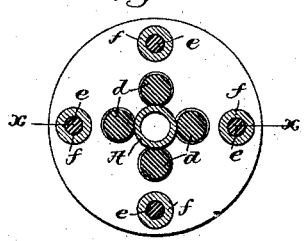
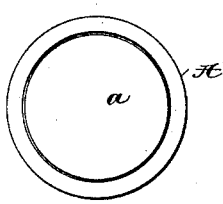
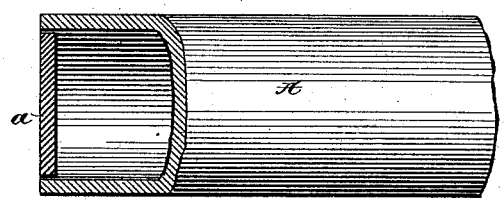
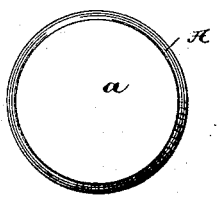
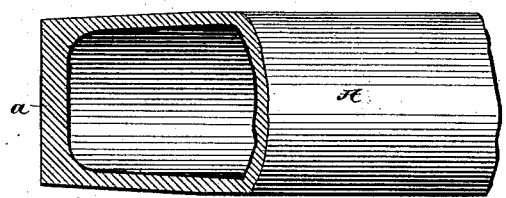
Attest:
Geo. H. Botts.
A. H. Jasborn.
Inventor:
Carleton W. Nason
by Morrison & Phelps
Attys:

UNITED STATES PATENT OFFICE.

CARLETON W. NASON, OF NEW YORK, N. Y.

MACHINE FOR WELDING PLUGS IN THE ENDS OF TUBES.

SPECIFICATION forming part of Letters Patent No. 331,527, dated December 1, 1885.

Application filed August 28, 1885. Serial No. 175,534. (No model.)

*To all whom it may concern:*

Be it known that I, CARLETON W. NASON, a citizen of the United States, residing at New York, county of New York, and State of New York, have invented certain new and useful Improvements in Machines for Closing the Ends of Metal Tubes, fully described and represented in the following specification and the accompanying drawings, forming a part of the same.

This invention relates to a mechanism for closing the ends of metal tubes, and particularly of such comparatively small tubes as are employed in the manufacture of steam-radiators and for other similar purposes.

In closing the ends of tubes for radiators and for similar purposes it has heretofore been customary to turn in and weld together the edges of the end of the tube, and this has been accomplished either by hammering or by pressing the end of the tube, when properly heated, into a concave revolving die, which is operated to bend or crimp inward and weld together the edges of the end of the tube. The first of these methods is not practicable when the tubes are to be produced in large quantities, because of the expense involved, and the second has not proved satisfactory in practice, because many of the tubes thus produced were found when put in use to be imperfectly closed, and were consequently worthless.

I have found that the ends of metal tubes, and particularly of comparatively small tubes—such as are used for steam-radiators and for similar purposes—can be quickly, cheaply, and perfectly closed by inserting a snugly-fitting disk into the end of the tube which it is desired to close, then heating the end of the tube and the disk to the welding-point, and then subjecting the heated end of the tube to the action of rolls, by which it is rolled down tightly around the disk, so as to be welded thereto, thus making the disk integral with the tube and perfectly closing the end of the latter.

The present invention relates particularly to a mechanism for carrying the method just stated into practical operation; and in order that it may be readily understood it will now be described in detail, reference being had to the accompanying drawings, in which—

Figure 1 is a side elevation of a mechanism embodying the present invention. Fig 2 is a plan or top view of the same. Fig. 3 is a horizontal section of the revolving head carrying the rolls for acting on the end of the tube, the same being taken on the line *x x* of Figs. 1, 4, and 5. Fig. 4 is a front or face view of the head. Fig. 5 is a cross-section of the same, taken on the line *z z* of Figs. 1, 2, and 3. Fig. 6 is an end view, and Fig. 7 a side view, partly in section, both upon an enlarged scale, of the tube after the disk has been inserted. Figs. 8 and 9 are similar views of the tube after its end has been closed.

Referring to said drawings, it is to be understood that B represents the base or bed of an ordinary lathe, and C D the usual head and tail stocks. The head-stock C is provided with the usual live-spindle, *i*, having the usual driving-pulleys, *j*, and the tail-stock D, which is made adjustable upon the bed B, is provided with a dead-spindle, *l*, and with the usual bolt, *k*, by which it can be secured in any position to which it is adjusted. The dead-spindle *l*, instead of being moved up to its work by means of a screw, as is usual, is arranged to slide freely in bearings *m* in the tail-stock, and is connected to a hand-lever, *n*, which is connected, through a link, *o*, with a post, *p*, rising from the base of the tail-stock. The live-spindle *i* is provided with a head, which is composed of two plates, *b c*, between which are mounted a number (four, as shown in the present case) of small rolls, *d*, which are arranged to turn freely. The plates *b c* are rigidly connected by means of bolts *e*, and are held the proper distance apart by means of interposed washers *f*. The plate *b* is provided with a suitable threaded shank, *g*, by which it can be attached to the spindle *i*, the same as an ordinary chuck, and the plate *c* is provided with a central opening, *h*, through which the end of the tube can be inserted so as to be presented to the rolls *d*.

In addition to the head and tail stocks C D the bed B is provided with one or more forked rests or supports, *r*, which are located between the head and tail stocks and are supported upon plates *s* which are clamped above and below the bed B.

The operation of the apparatus just described is as follows: The disk *a*, which is simply a piece punched out of a metal plate of suitable thickness, having been inserted in the end of the tube A, as shown in Figs. 6 and 7, and the end of the tube and disk having been heated to the welding-point, the tube will be placed in the rests r and the tapering end t of the spindle l inserted into its open end, as shown by dotted lines in Figs. 1 and 2. The live-spindle i being then in motion, so as to cause the head carrying the rolls d to revolve rapidly, the lever n will be shifted so as to move the spindle l and the tube A longitudinally, and enter its end containing the disk a into the opening h and between the rolls d. The rolls d then rolling rapidly around the end of the tube, will roll its edge down around the disk a, so that the two will be welded together and become integral, as shown in Figs. 3, 8, and 9. In order to cause the rolls d to act upon the tube with the necessary pressure, they are made slightly tapering, as shown, so that as the end of the tube is pressed inward between them they will act with an increasing pressure, and thus roll down the end of the tube and correspondingly thicken the disk, as shown.

As the welding is completed the end of the tube will abut against the plate b, as shown in Fig. 3, and thus cause the end of the tube to be left in a smooth and flat condition.

The end t of the spindle l is suitably milled or roughened, so as to take a firm hold upon the end of the tube to prevent it from turning during the welding operation.

Although it is preferable that the tube should be held stationary and the rolls d caused to revolve around it, as shown in the present case, yet it is manifest that the same result may be accomplished by reversing the operation. In such case the head carrying the rolls would be mounted upon the dead-spindle and the tube would be revolved by the live-spindle, or, if preferred, both the head and the tube may be revolved, but in opposite directions.

In conclusion, it is to be remarked that the number of the rolls d may be more or less than shown, and also that the rolls may be supported in a different manner from that shown, without departing from the invention. It is also to be understood that the dead-spindle l may be operated by other means than the hand-lever, although the lever is the most convenient means for the purpose. The rests r may also be more or less in number than shown, or may be entirely omitted without departing from the invention. So, also, other means may be provided for preventing the tube from revolving during the welding operation.

The method of closing the ends of tubes herein described is not herein claimed, as the same forms the subject-matter of a companion application for Letters Patent.

What I claim is—

1. The combination, with the rolls d, arranged to receive the end of the tube between them, of means for presenting the end of the tube between the rolls, substantially as described.

2. The combination, with the rolls d, mounted in the revolving head and arranged to receive the end of the tube between them, of means for presenting the end of the tube between the rolls, substantially as described.

3. The combination, with the rolls d, mounted in the revolving head and arranged to receive the end of the tube between them, of the longitudinally-moving spindle l, having the milled or roughened end t, for holding the tube, substantially as described.

4. The combination, with the rolls d, mounted in the revolving head and arranged to receive the end of the tube between them, of one or more rests, as r, and the longitudinally-moving spindle l, substantially as described.

In testimony whereof I have hereunto set my hand in the presence of two subscribing witnesses.

CARLETON W. NASON.

Witnesses:
JAS. J. KENNEDY,
DANIEL I. O'SULLIVAN.